United States Patent [19]

Daines

[11] Patent Number: 5,740,989
[45] Date of Patent: Apr. 21, 1998

[54] LAY DOWN SEAT MECHANISM

[76] Inventor: Paul H. Daines, 455 Washington, Montpelier, Id. 83254

[21] Appl. No.: 577,120

[22] Filed: Dec. 26, 1995

[51] Int. Cl.⁶ .................................................. B64D 11/06
[52] U.S. Cl. .......................... 244/118.6; 244/122 R; 297/63; 297/65; 297/232; 297/236
[58] Field of Search ................... 244/118.5, 118.6, 244/122 R; 105/315, 316, 322; 297/188.04, 188.08, 188.11, 63, 64, 65, 232, 234, 236

[56] References Cited

U.S. PATENT DOCUMENTS

| | | | |
|---|---|---|---|
| 2,081,529 | 5/1937 | Canney | 244/118.6 |
| 2,280,065 | 4/1942 | Roode | 244/118.6 |
| 2,608,366 | 8/1952 | Jergenson | 244/118.6 |
| 4,589,612 | 5/1986 | Halim | 244/118.6 |
| 4,735,456 | 4/1988 | Haefelfinger | 297/63 X |
| 4,936,527 | 6/1990 | Gorges | 244/118.6 |
| 5,333,818 | 8/1994 | Brandt et al. | 244/118.6 |
| 5,425,516 | 6/1995 | Danies | 244/118.6 |

*Primary Examiner*—William Grant

[57] ABSTRACT

A lay down seat mechanism for a seating system having a front seat that is mounted on a support structure raised above the aircraft floor and having a foot rest that is raised above the aircraft floor and a back seat that is pivoted from an upright seating position behind the front seat to a fully reclined position extending beneath the raised front seat.

11 Claims, 4 Drawing Sheets

5,740,989

1

LAY DOWN SEAT MECHANISM

SPECIFICATION

1. Field of the Invention

This invention relates to mechanism for pivoting aircraft seats between a locked upright position and a fully reclined posit ion.

2. State of the Art

Passengers on overseas airline flights lasting many hours are often very uncomfortable for much of the flight. At the present time such passengers are required to sit upright or to sit in a slightly inclined position.

In my U.S. Pat. No. 5,425,516 I have disclosed a system of aircraft seating that will allow some passenger seats to be fully reclined beneath other seats that can then be partially reclined to a greater extent than is possible with other known seating systems. This system allows at least a large number of the passenger seats of an aircraft to be placed in position permitting more comfortable sleeping for the passengers in such seats.

The weight of aircraft seats and the mechanisms used to support the seats are critical to the airlines and must be maintained below established limits in order to allow maximum passenger and cargo loading and maximum profits to the operating airline.

Likewise, any mechanism used to support airline seats that move between a locked fully upright position and a lowered, fully reclined position, must be as low weight as possible and must be operable without increasing the space required for the fully reclined seat such that the overall number of seats that can be placed in an area of the aircraft must be drastically reduced.

FEATURES OF THE INVENTION

It is a principal feature of the invention to provide an operating mechanism for an airline seat that will allow the seat to be removed between a fully upright locked position and a fully reclined position.

Other objects are to provide an operating mechanism for a reclinable airline seat that is easily operated, light in weight and that does not increase the space required for the seat assembly when installed in an aircraft.

Another object is to provide a lay down seat assembly that includes assistance means for use by reclining passenger upon entering or exiting a fully reclined seat.

Still another object is to provide a divider means between fully reclined seats for the convenience, safety and comfort of the passengers.

It is also an object of the invention to provide a seating system that can be easily cleaned.

Additional objects and features of the invention will become apparent to those skilled in the art to which the invention pertains from the following detailed description and drawings.

THE DRAWING

In the drawings:

FIG. 1 is a perspective view of passengers in a typical airline seating arrangement, with a row of front seats and a row of rear seats aligned behind the row of front seats and the rear seats in a fully upright locked position;

FIG. 2 a perspective view of a front seat and an aligned rear seat, with the rear seat intermediate its fully upright and fully reclined positions;

2

FIG. 3 a perspective view slowing a passenger reclining on the rear seat, with the rear seat in its fully reclined position;

FIG. 4 a side elevator view of the seat support mechanism for the rear seat of FIGS. 1-3, with the seat and seat back cushions removed; and FIG. 5 a fragmentary perspective view showing the rear locking apparatus for the seat support mechanism.

DETAILED DESCRIPTION

Figure 1:
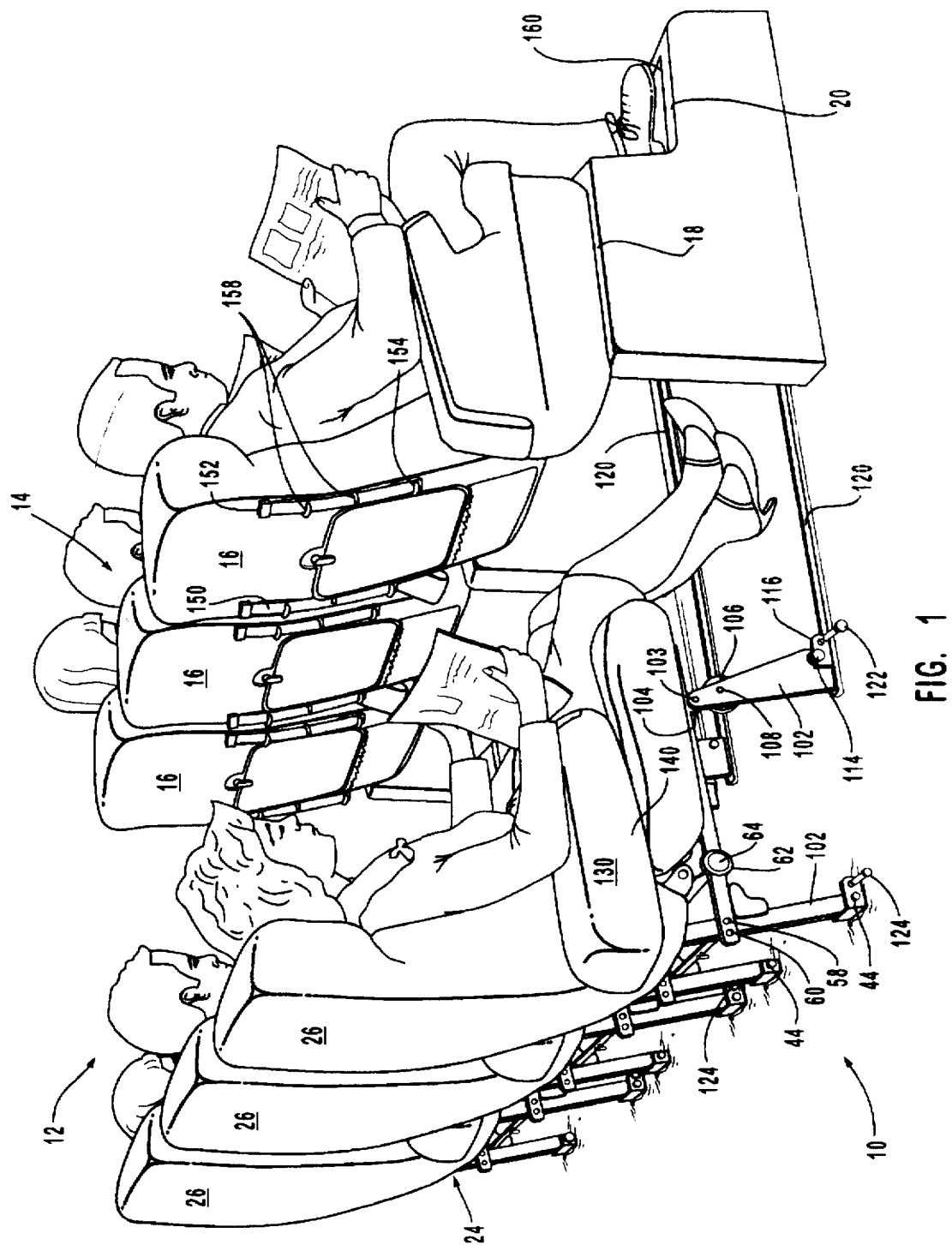
Figure 2:
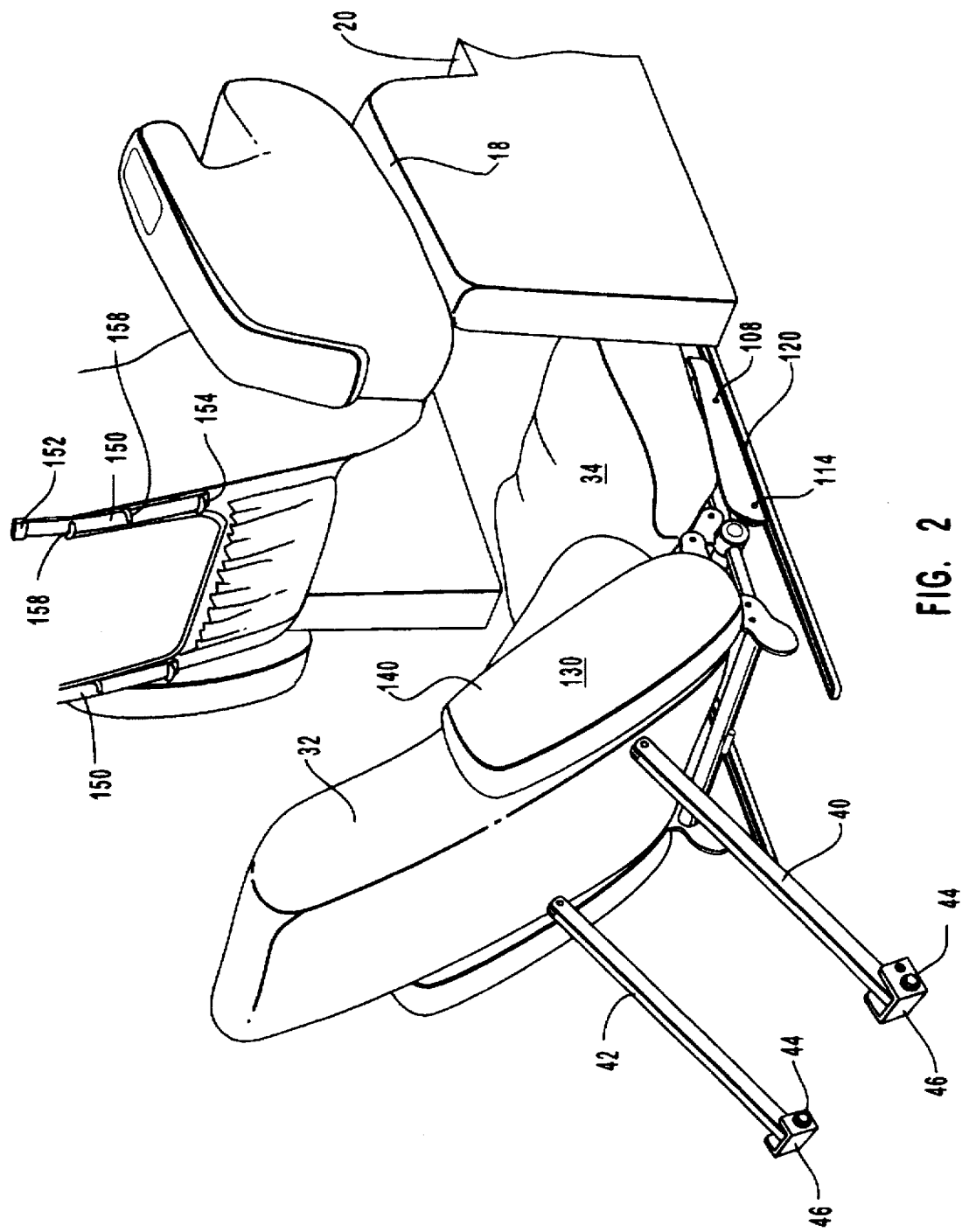
Figure 3:
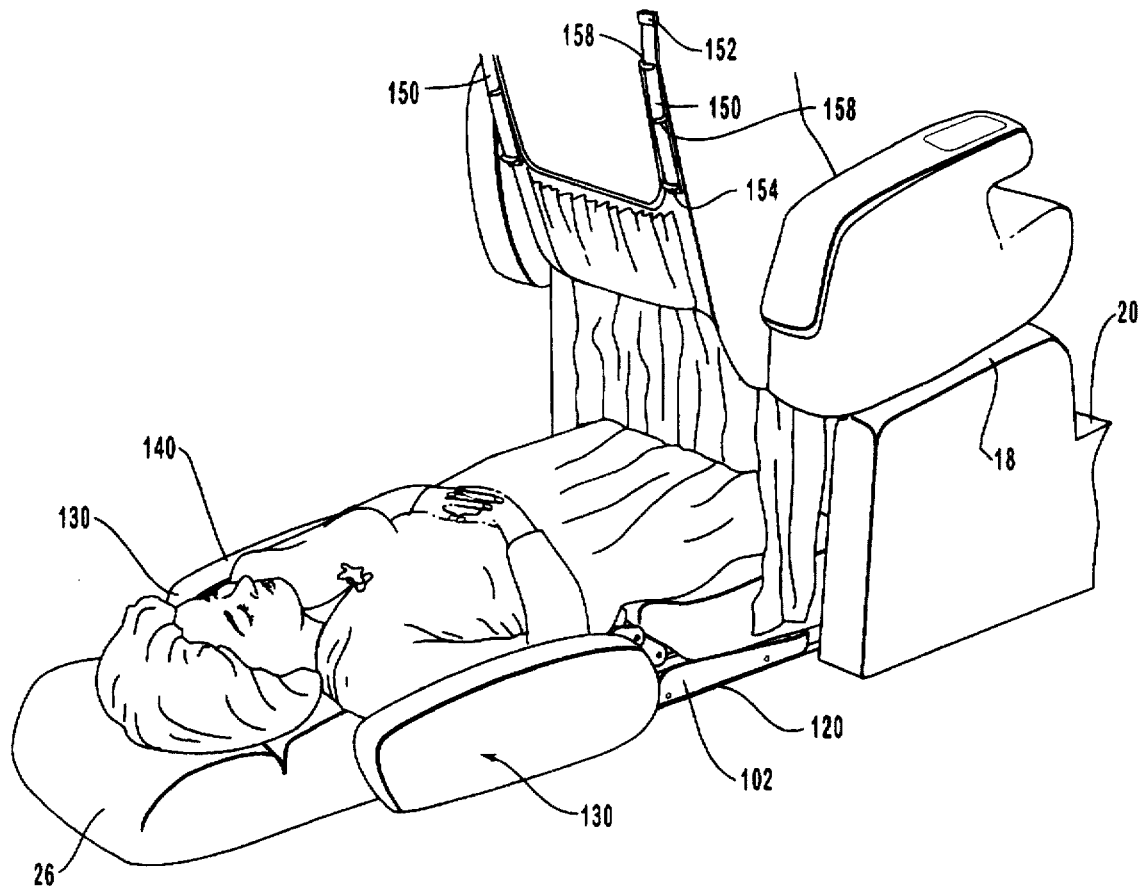
Figure 4:
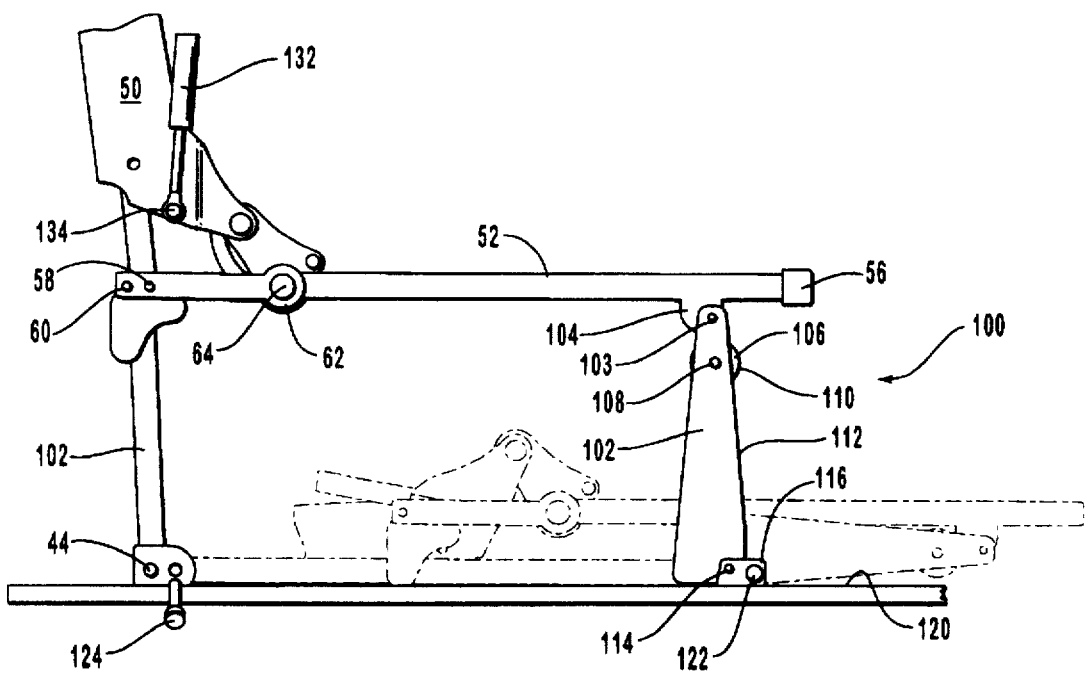
Figure 5:
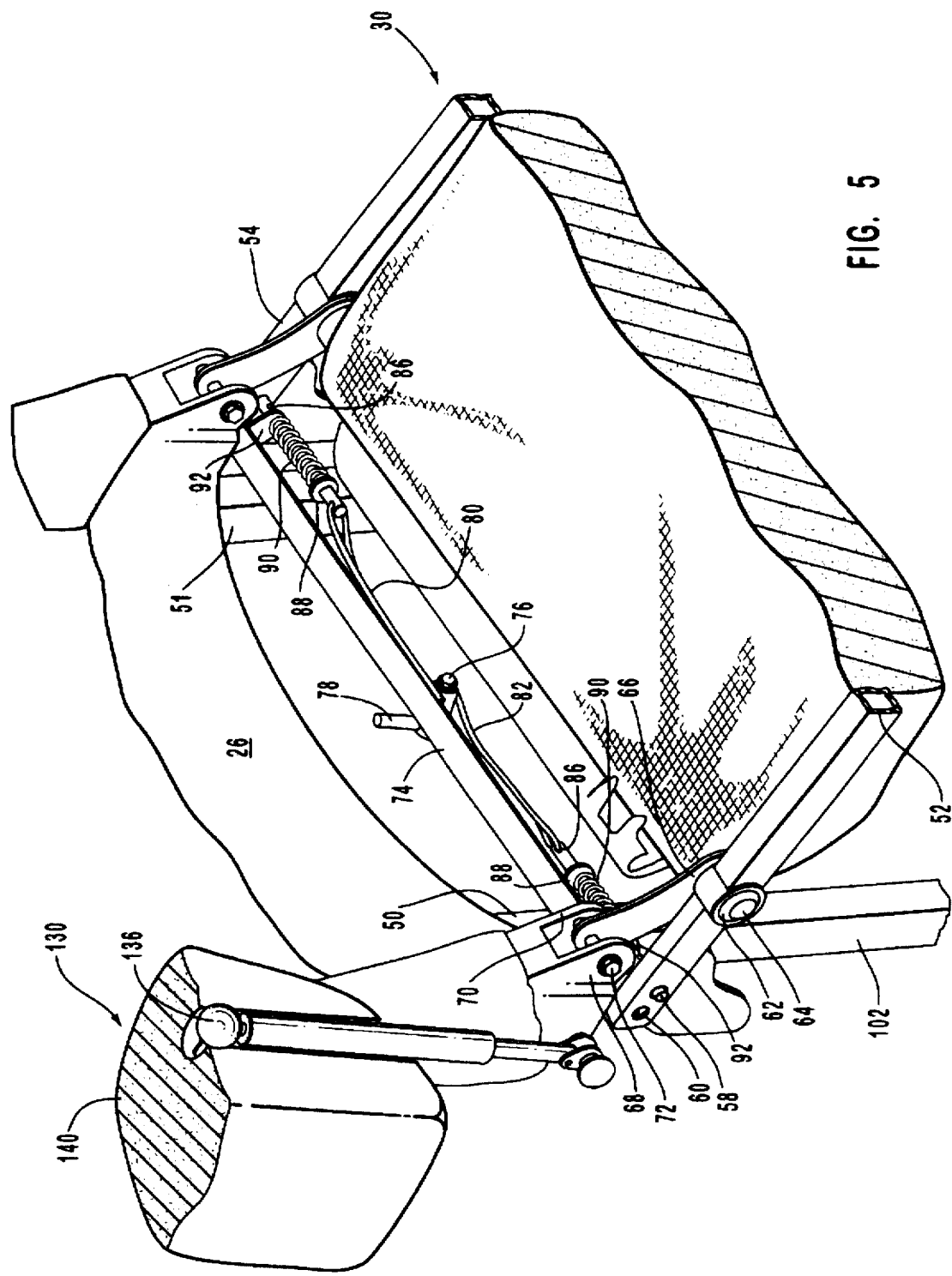

Referring to the drawings:

In the illustrated preferred embodiment of the invention the lay down seat mechanism is shown generally at 10 is a component of a seating system, shown generally at 12.

The seating system 12 includes a front row 14 of seats 16 resting on a raised platform 18 and having a raised foot rest 20 to receive the feet of passengers sitting in the seats 16. Seats 16 are of conventional airline seat construction and include the usual means for rearwardly tilting the seat back with respect to the seat bottom and for locking the seat 16 in a rearwardly tilted position. The spaces between each of the platforms 18 and foot rests 20 and the floor of the air-craft are fully open.

A back row 24 has a row of back seats 26 aligned behind the front seats 16. Each of the back seats is supported by a lay down seat mechanism 10.

Each back seat 26 includes a back support frame 28 and a bottom support frame 30. A back seat cushion 32 is releasably attached to the back support frame and a bottom seat cushion 34 is releasably attached to the bottom support frame 30 in conventional fashion, using hook and loop correctors, not shown.

A pair of spaced apart rear leg members 40 and 42 each have one end pivotally connected at 44 within one of a pair of spaced apart brackets 46 that are securely fixed to the aircraft floor. The leg members 40 and 42 are respectively pivotally connected at 48 to side members 50 and 51 of the back support frame 28. Brackets 46 limit pivoting movement of the leg members 40 and 42 between arm upstanding position and a lowered position extending towards the front seats 16.

A pair of side rails 52 and 54 form opposite side supports for the bottom support frame 30 and are interconnected at front ends by a crossbar 56. A pair of spaced apart holes 58 and 60 are provided in rear ends of the side rails 52 and 54.

A journal housing 62 is provided in each of the side rails 52 and 54 to receive a stub shaft 64 projecting from one end of a link 66. The other end of each link 66 extends between ears 68 and 70 of side members 50 and 51 and pivot pins 72 extend through the ears 68 and 70 and the links 66. A channel member 74 is fixed between side members 50 and 51. A pin 76 extends through the back of channel member 74 and has a handle 78 on one end thereof, outside the channel member. A first flexible tether 80 is fixed to a top surface of the pin 76 inside the channel member and a second flexible tether 82 has one end fixed to a bottom surface of the pin 76. The other ends of flexible tethers 80 arid 82 are each connected to one end of a locking pin 86 that is guided through an ear 88 projecting from the back of the channel member 74 and through a side member 50 or 51 to extend into a selected one of the holes 58 or 60 of a side rail 52 or 54. A spring 90 on each of the locking pins 86 acts between an ear 88 and a collar 92 fixed to the locking pin to bias the locking pin into a hole 58 or 60. Rotation of the handle 78 will turn pin 76 to wrap the flexible tethers 80 and 82 around the pin and to pull the locking pins 86 from the holes 58 or 60. Positioning of holes 58 or 60 to be engaged by the locking pins 86 will determine the tilt of the seat back support frame 88 relative to the bottom support frame 30.

Each front leg assembly 100 includes a leg 102 that is pivotally connected at one end by a pivot pin 103 to a flange 104 depending from the side rails 52 and 54, adjacent to the front ends of the rails interconnected by crossbar 56.

A roller 106 is journaled on a pivot shaft 108 extending through the leg 102. The periphery 110 of the roller extends beyond the forward edge 112 of the leg 102.

The other end of leg 102 is pivotally connected at 114 to a slide block 116. Each slide block 116 travels within a floor guide track 120 that is mounted to the floor of the aircraft and that extends into the space beneath front seat 16.

In operation, when a back seat 26 is in an upright position and is to be lowered to a fully reclined position handle 78 is turned to move locking pins 86 from the hole 58 or 60 into which it has been inserted. Thereafter, the back seat is moved forward and down as the rear leg members 40 and 42 pivot at 44 and the front legs 102 initially move forward with slide blocks 116 while the slide blocks travel within floor guide track 120. Continued forward movement of the back seat will pivot the front legs 102 at pivot connections 114 and will move the rollers 106 to travel in the floor guide tracks 120 as the bottom support frame 30 and bottom seat cushion 34 move beneath the front seat 16. At the same time the back seat 26 pivots at stub shafts 64 to a lowered position, thus forming a fully reclined seat assembly.

To move the lay down seat assembly 10 back to a sit-up position it is only necessary to pivot the back seat 26, with the stub shafts 64 rotating within the journal housings 62, to an upright position where the locking pins 86 are biased by springs 90 into a selected hole 58 or 60 of the side member 50 or 52. Thereafter the seat back 26 is moved rearwardly and up as the rear leg members 40 and 42 of the bottom support frame 30 pivot at the brackets 46 and the front legs 102 pivot at the slide block 116.

A lock pin 122 may be removably inserted through guide track 120 and slide block 116 to positively prevent forward movement of the slide block and pivoting of the seat 26 downwardly, if desired. In addition, or alternatively, a lock pin 124 may be removably inserted through a bracket 46 and a rear leg member 40 or 42 to also prevent forward pivoting of the rear leg members 40 and 42 and the front legs 102.

An arm rest 130 is pivotally connected to each side member 50 and 51 and is supported by a support arm 132 that has one end pivotally connected at 134 to a side member 50 or 51 below the arm rest and a universal coupling 136 located intermediate the length of the arm rest. The arm rest pivots to be cantilevered from the back rest 26 when the seat back is in a raised position. When the seat bottom and seat back are fully reclined the arm rest 130 is pivoted to extend along the seat back. A protruding portion 140 of each arm rest then extends upwardly from the seat bottom and seat back to provide barriers that will separate passengers and that will hold fully reclined passengers on their fully reclined seats.

A fully reclined passenger desiring to sit up in a fully reclined back seat 26, or to get out of the seat, may use the pair of spaced apart strap handles 150, provided therefor at the back of each front seat 16. Each strap handle 150 is made of a suitable, strong, flexible strap material. The ends of each length of the strap material are secured to the back of front seat 16 at 152 and 154 and each length is then secured at one or more locations 158 intermediate the connections 152 and 154.

It has been found that it may be difficult to clean the spaces beneath the raised platform 18 and foot rest 20 in an aircraft fitted with the seating systems 12 of the invention. However, this is corrected by cleaning the spaces beneath the raised platform 18 and foot rest 20 through a trap door 160, form in the top surface of the foot rest 20. Such trap door may be removable, hinged or otherwise secured in place, in known fashion.

Although a preferred embodiment of the invention has been herein described, it is to be understood that the present disclosure is by way of example and that variations are possible without departing from the subject matter coming within the scope of the following claims, which subject matter is regarded as the invention.

I claim:

1. A lay down seat mechanism for a back seat of a seating system having a front row of seats resting on a platform raised from the floor of an aircraft and a foot rest spaced above the floor of the aircraft and a row of back seats, said lay down seat mechanism comprising a seat bottom support frame;

a seat back support frame;
   means selectively and releasably pivotally connecting said seat back support frame to said seat bottom support frame;

a pair of spaced apart rear legs each having one end pivotally connected to the aircraft floor and an opposite end pivotally connected to the seat back support;

a pair of guide tracks fixed to the aircraft floor and extending into the space beneath the platform raised from the floor;

a slide block slidable within each of said guide tracks; and a front leg having one end pivotally connected to each of said slide blocks and each said front leg having another end pivotally connected to said seat bottom support frame, whereby said front legs move with said slide blocks as said front legs pivot about the pivot connection between the said legs and said slide blocks.

2. A lay down seat mechanism as in claim 1 further including a roller carried by each front leg intermediate the length of the leg, said rollers rolling in said guide tracks when said seat bottom support frame is pivoted forwardly and down to a seat reclining position.

3. A lay down seat mechanism as in claim 2, further including means to releasably lock said front and rear legs against rotation from the upright position.

4. A lay down seat mechanism as in claim 3, wherein said means to releasably lock said front and rear legs against rotation from the upright position includes pin means inserted through at least one guide track and one slide block.

5. A lay down seat mechanism as in claim 3, wherein said means to releasably lock said front and rear legs against rotation from the upright position includes pin means inserted through at least one anchor means fixed to the floor and pivotally mounting one of said rear legs and thorough said rear leg.

6. A lay down seat mechanism as in claim 3, further including at least one arm rest pivotally connected to one side of said back support frame and pivotable between a position extending forwardly from said back support frame and a position extending alongside said back support frame.

7. A lay down seat mechanism as in claim 6, wherein each said arm rest has a padded portion extending forwardly of the arm rest, for substantially the length of the arm rest, when said arm rest is positioned to be extending alongside the back support frame.

8. A lay down seating system for aircraft including a front seat resting on a platform raised from the floor of an aircraft;

a foot rest spaced above the floor of the aircraft and positioned to receive the feet of a passenger seated in the front seat, the space between said platform and said aircraft floor being open to the space between said foot rest and said aircraft floor;

a back seat positioned behind said front seat with both said front seat and said back seat facing in the same direction;

means to move said back seat between an upright seating position and a fully reclined lowered position with a foot portion extending beneath said front seat and said foot rest.

9. A lay down seating system for aircraft as in claim 8, further including trap door means through the foot rest, providing access to the spaces between said foot rest and the aircraft floor and the platform and the aircraft floor.

10. A lay down seating system for aircraft including a front seat resting on a platform raised from the floor of an aircraft;

a foot rest spaced above the floor of the aircraft and positioned to receive the feet of a passenger seated in the front seat, the space between said platform and said aircraft floor being open to the space between said foot rest and said aircraft floor;

a back seat positioned behind said front seat;

means to move said back seat between an upright seating position and a fully reclined lowered position extending beneath said front seat;

trap door means through the foot rest, providing access to the spaces between said foot rest and the aircraft floor and the platform and the aircraft floor; and at least one arm rest pivotally mounted to the back seat and movable between a position extending forwardly of a back of said back seat when said back seat is in an upright position and a position extending along the back of said back seat when said back seat is in a fully reclined position, said arm rest having a portion extending above the seat back when said back seat is in a fully reclined position.

11. A lay down seating system for aircraft including a front seat resting on a platform raised from the aircraft floor;

a flat foot rest spaced above the floor of the aircraft and positioned to receive the feet of a passenger seated in the front seat, the space between said platform and said aircraft floor being open to the space between said foot rest and said aircraft floor;

a back seat positioned behind and facing the same direction as said front seat;

means to move said back seat between an upright seating position and a fully reclined position having a leg and foot portion extending beneath said front seat and said flat foot rest; and strap handles fixed to the back of said front seat to be grasped by a passenger moving into or out of the back seat when said back seat is in the fully reclined position.

* * * * *